US010110055B2

(12) United States Patent
Inskeep (10) Patent No.: US 10,110,055 B2
(45) Date of Patent: *Oct. 23, 2018

(54) FAST CHARGING HIGH ENERGY STORAGE CAPACITOR SYSTEM JUMP STARTER

(71) Applicant: Mathew Inskeep, Highland Beach, FL (US)

(72) Inventor: Mathew Inskeep, Highland Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/482,044

(22) Filed: Apr. 7, 2017

(65) Prior Publication Data

US 2017/0310153 A1    Oct. 26, 2017

Related U.S. Application Data

(63) Continuation-in-part of application No. 14/509,111, filed on Oct. 8, 2014, now Pat. No. 9,673,652.

(60) Provisional application No. 61/889,082, filed on Oct. 10, 2013.

(51) Int. Cl.
| | |
|---|---|
| *H01M 10/44* | (2006.01) |
| *H01M 10/46* | (2006.01) |
| *H02J 7/34* | (2006.01) |
| *H02J 7/00* | (2006.01) |
| *B60L 11/18* | (2006.01) |
| *H02J 1/00* | (2006.01) |

(52) U.S. Cl.
CPC ........... *H02J 7/345* (2013.01); *B60L 11/1816* (2013.01); *H02J 7/0054* (2013.01); *B60L 2240/527* (2013.01); *B60L 2240/529* (2013.01); *B60L 2240/547* (2013.01); *B60L 2240/549* (2013.01); *B60L 2250/16* (2013.01); *H02J 2001/006* (2013.01)

(58) Field of Classification Search
CPC ...... H02J 7/0034; H02J 7/0042; H02J 7/0054; H02J 7/355; H02J 7/345
USPC .................. 320/103, 105, 107, 114, 166, 167
See application file for complete search history.

(56) References Cited

U.S. PATENT DOCUMENTS

| | | | | |
|---|---|---|---|---|
| 6,988,475 B2 * | 1/2006 | Burke | ................ | F02N 11/0866 320/105 |
| 7,501,795 B2 * | 3/2009 | Bertness | ............... | H02J 7/0054 320/125 |
| 9,673,652 B2 * | 6/2017 | Inskeep | ................ | H02J 7/0054 |
| 2003/0184258 A1 * | 10/2003 | VonderHaar | ........... | F02N 11/14 320/103 |

* cited by examiner

*Primary Examiner* — Edward Tso (57) ABSTRACT

A fast charging high energy storage capacitor system jump starter is described. The jump starter apparatus incorporates a method of using reserve energy from a depleted electrical system such as an automobile battery or using energy from another energy source, combined with a fast charging high energy capacitor bank to enable the rapid and effective way to jump start a vehicle.

36 Claims, 8 Drawing Sheets

FAST CHARGING HIGH ENERGY STORAGE CAPACITOR SYSTEM JUMP STARTER

This application is a continuation-in-part of U.S. application Ser. No. 14/509,111, filed Oct. 8, 2014, which claims the benefit of and priority to of U.S. Application Ser. No. 61/889,082, filed Oct. 10, 2013. Both applications are incorporated by reference in their entireties for all purposes.

TECHNICAL FIELD

The present disclosure describes a novel portable system that receives energy from an energy source and which includes a high-energy capacitor bank that can be used, in one non-limiting example, as a jump starter assist for starting an automobile having a depleted vehicle battery.

BACKGROUND

Once a vehicle battery is depleted, it is often unavailable for further using to start the vehicle. Typically, the vehicle owner/user has to wait for a service provider, such as a tow truck driver, to arrive and replace the vehicle battery or tow the vehicle to a service location. The present disclosure is directed to a new novel approach and system for starting the vehicle without the need of waiting for a service provider to arrive.

SUMMARY OF THE DISCLOSURE

The present disclosure relates generally to a portable jump starter system that allows depleted batteries typically found in automobiles to be rapidly charged to start an engine. In one non-limiting embodiment, the system can use reserve energy from a depleted electrical system that would typically be found in a depleted car battery and rapid charge the battery through a high-energy capacitor(s). In another non-limiting embodiment, the system can use energy from another energy source that is supplied to the high-energy capacitor(s).

Thus, in one non-limiting embodiment, a method is provided for using the reserve energy from a depleted electrical system or energy from another energy source and a fast charging high energy capacitor bank, comprised of at least one single cell or multiple cells for the purpose of feeding the same reserve energy or energy from the other energy source back to that of a depleted electrical system at a higher voltage potential and at a rapid rate so the electrical system can be restored back to optimum performance. This can be illustrated by the following non-limiting example: A car uses a car battery for the sole purpose to turn its engine over. After the engine is turned, the electrical system of the car takes over and the battery work is completed. On occasions, the car battery dies and does not have enough power to perform its work, but typically there is still reserve energy left over in the battery or energy available from another electrical source. The disclosed system takes the battery's reserve energy or energy from another available electrical source and stores it temporarily in a capacitor bank. Then, this energy will be fed back to the same car battery at a higher voltage potential and at a rapid rate so the battery, in combination with the energy available from the capacitor bank, can turn an engine over (start the engine). The disclosed novel system and method is not limited to the automotive industry.

The disclosed novel system can accomplish the charging in two stages. The first stage is to achieve a higher energy potential than that of the energy source. This can be accomplished in one non-limiting embodiment by using an internal fast charge, up voltage converter. The second stage is to feed the extracted energy back to sustained or restart an already depleted external system that otherwise would lose functionality from a shutdown and become ineffective to restart.

The described high energy storage capacitor system can be lightweight for portability and ease of use by the consumer.

The novel system and method provide for relatively fast charging of a high-energy storage capacitor from a lower potential energy source for the purpose of providing a larger instantaneous energy boost current. The storage capacitor can be used as a form of storage component to quickly delivery bursts of energy. The system and method provide a way to harvest the reserved energy from an already depleted energy source, like an automobile battery, that is incapable of restarting the system due to low energy, and with the assistance of a high storage capacitor coupled with an energy source to provide a way to restart the system. The system and method utilizes high efficiency switching regulators for high power and current control. The system can have separate auxiliary ports, one for charging the high-energy storage capacitor and one for delivering the high current. Such system can draw energy via three methods: (1) integrated source; (2) external source or the reserved energy of the failed system, and; (3) coupled directly or through auxiliary power cords. This system is unique in that the high energy storage capacitor, once charged, can deliver instantaneous high bursts of energy in seconds capable of restoring a system back to its working condition. The invention is preferably not used as a permanent storage device or hardwired directly to an electrical system. Typically, other systems will not charge a high energy storage capacitor beyond its own energy source potential, and/or would be directly hardwired to the systems electrical system. The system can be preferably portable and ready to use in minutes without the need of special tools or training. It will be particularly valuable to the everyday consumer who has a depleted automotive battery and needs to jump start their vehicle without the need of another vehicle.

BRIEF DESCRIPTION OF THE DRAWINGS

FIG. 4 represents one non-limiting embodiment for the full system including first method to connect the basic charging system between the energy source and the high-energy storage capacitor, including integrals circuit elements, in accordance with the present disclosure. In addition, FIG. 4 represents a non-limiting method for connecting high energy storage capacitor output transmission line to a load device, utilizing a high-power switch to activate and high current clamps to connect to load device, in accordance with the present disclosure;

DETAILED DESCRIPTION

Figure 1:
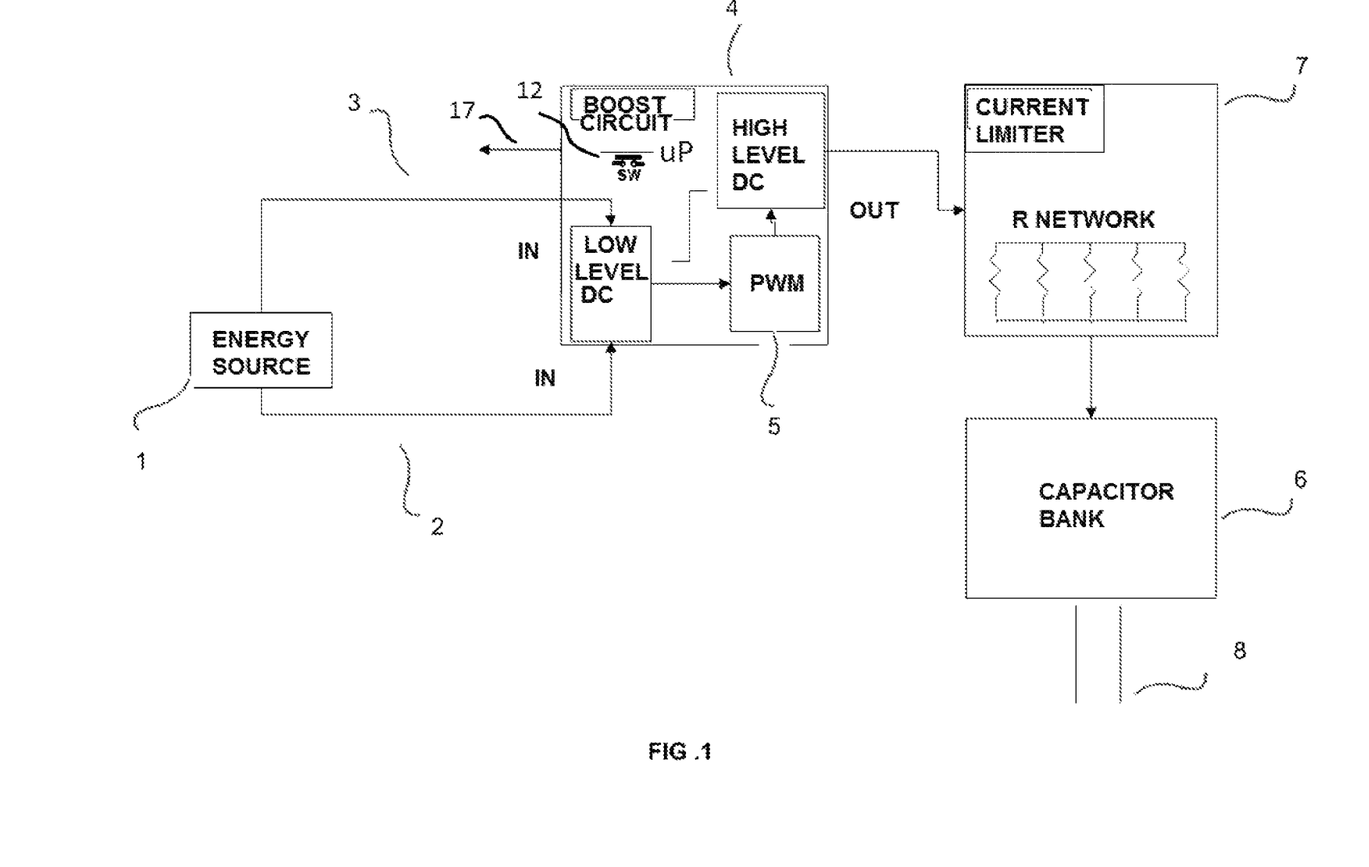
FIG. 1 is a representation of one non-limiting embodiment for the basic charging system between the energy source and the high-energy storage capacitor, including integral circuit elements and first non-limiting method to connect directly to the energy source in accordance with the present disclosure.
Figure 2:
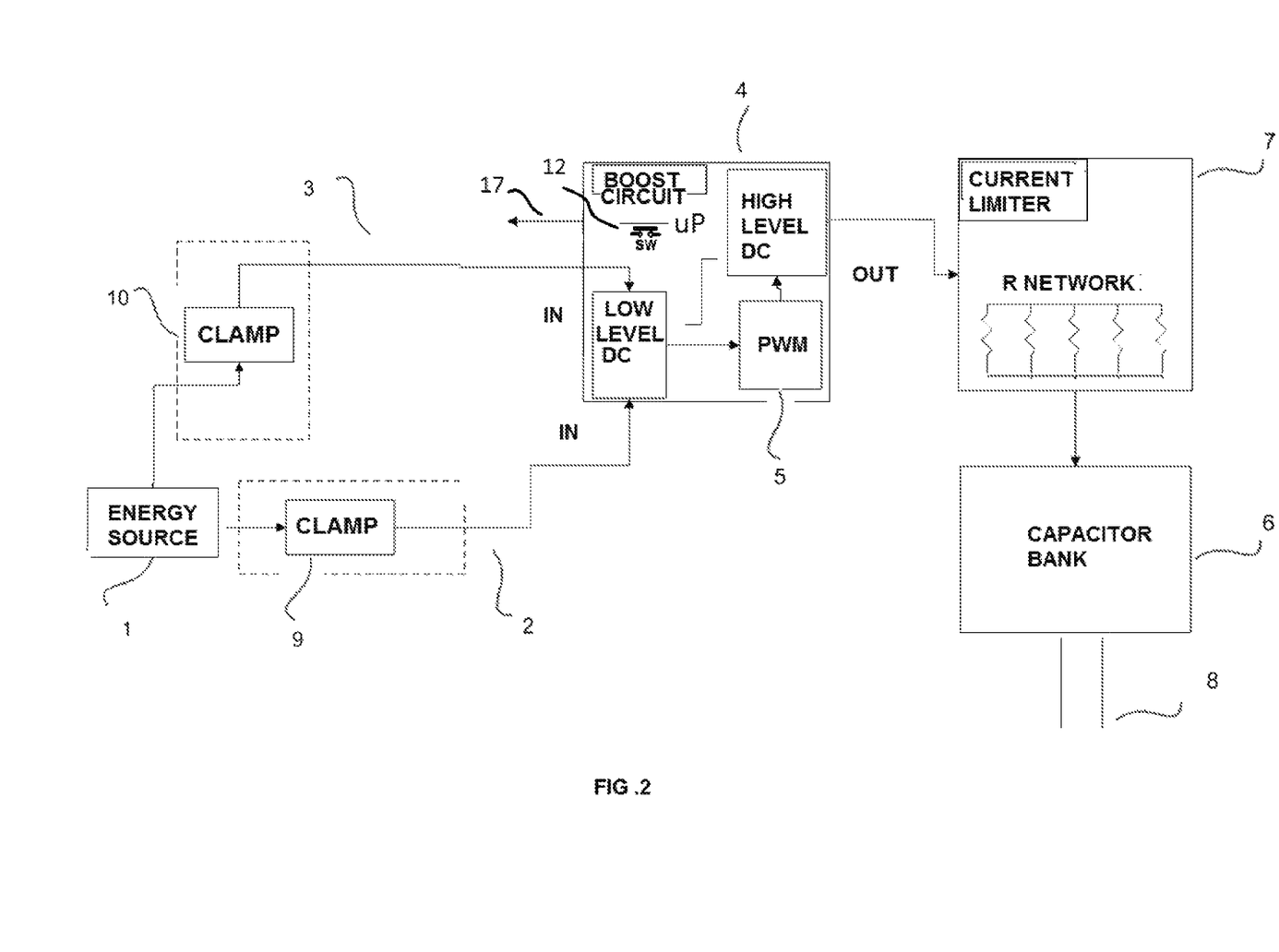
FIG. 2 is a representation of a second non-limiting method to connect the basic charging system between the energy source and high energy storage capacitor for recharging purposes in accordance with the present disclosure.
Figure 3:
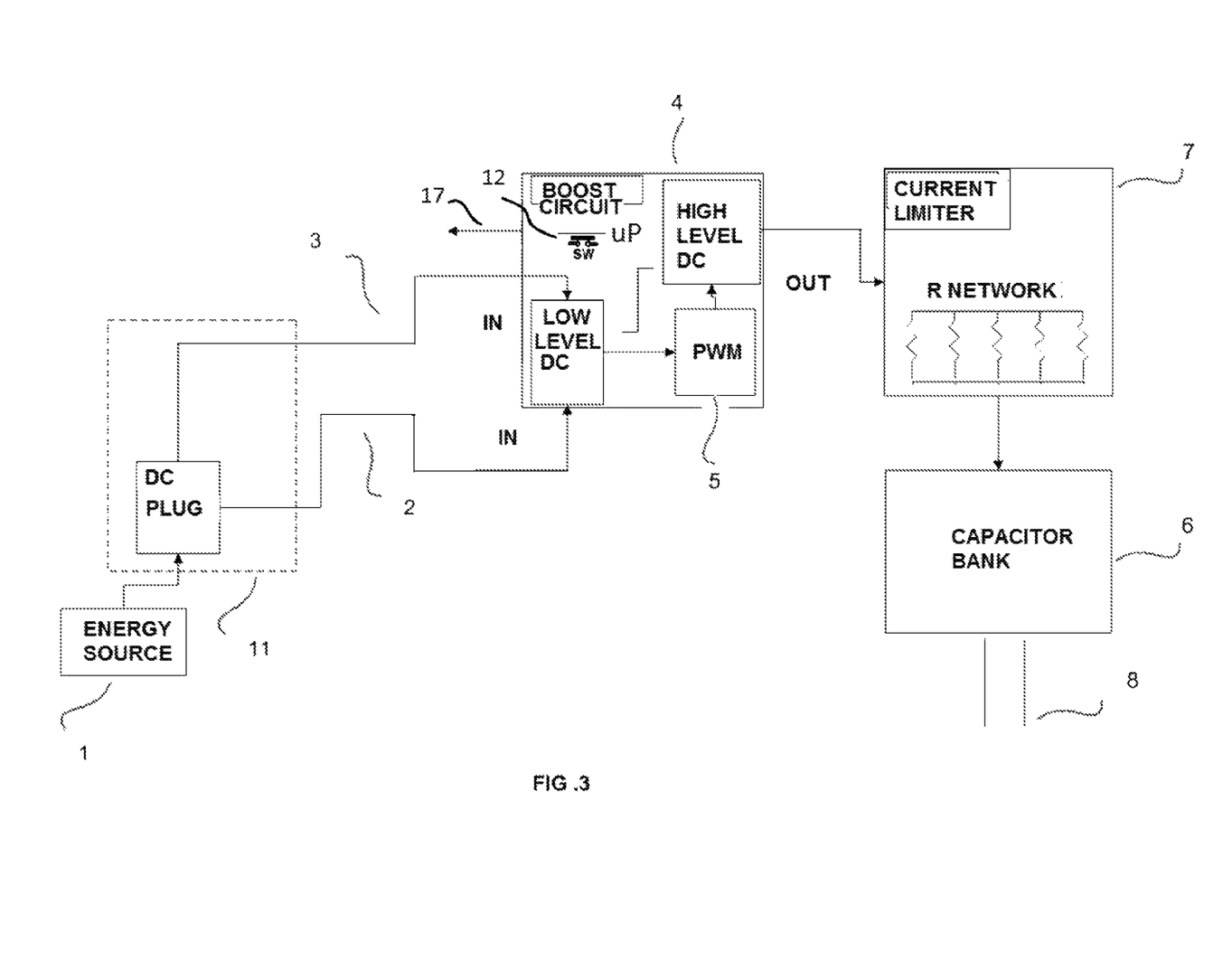
FIG. 3 represents a third non-limiting method to connect the basic charging system between the energy source and high energy storage capacitor for recharging purposes in accordance with the present disclosure.
Figure 6:
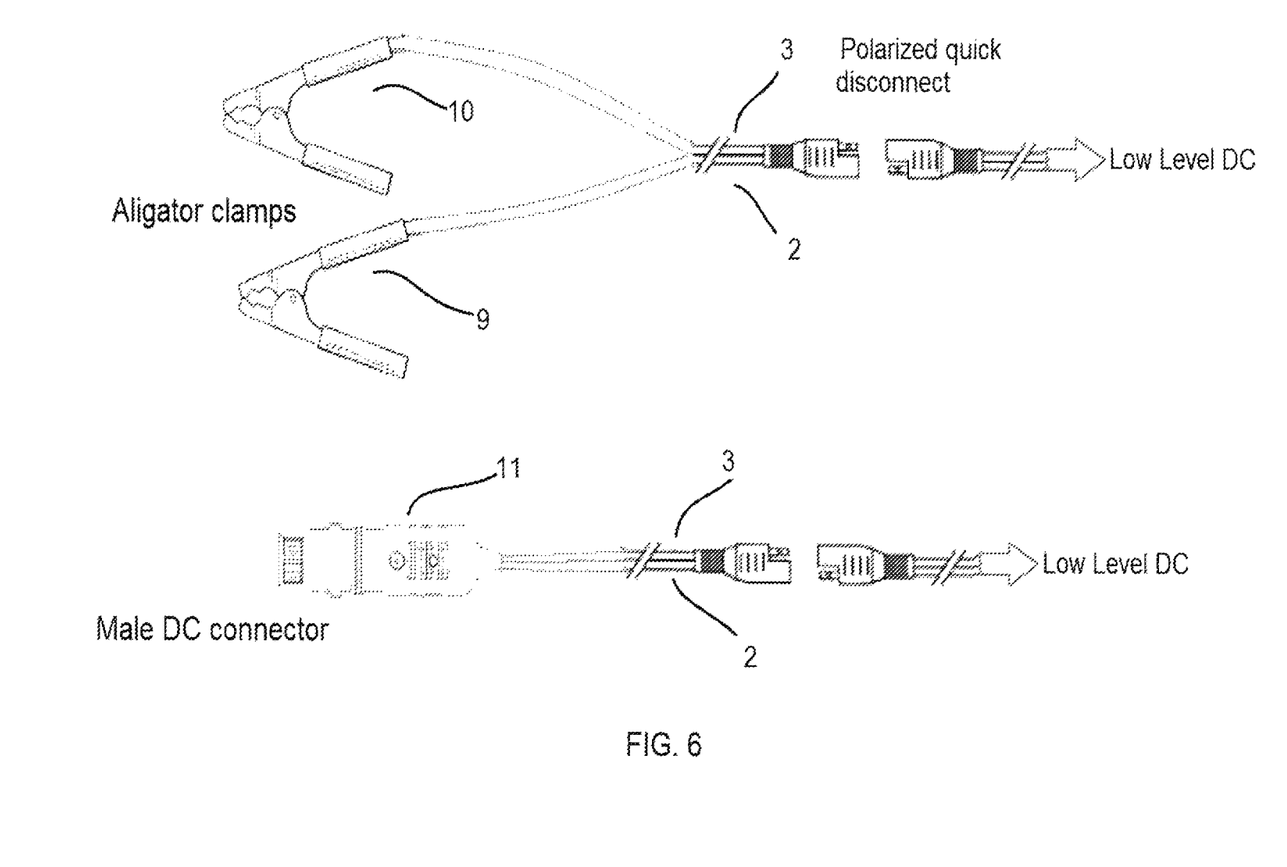
FIG. 6 is a representation of several non-limiting accessories that could be utilize to connect the invention to an external system for energy replenishing purposes in accordance with present disclosure.

Referring to the drawings on FIGS. 1, 2 and 3 which relate to an integral system composed of four major components coupled electrically and mechanically, which represent a basic charging system between an energy source 1 and a high energy storage capacitor bank 6 comprising of at least a single cell or a capacitor bank as described and characterized by the integral system that is electrically coupled using low power transmission lines 2 and 3 as input lines, as well as, high power output/input transmission lines 8 as described. The low power transmission lines 2 and 3 will implement several methods of coupling to an integrated energy source as claimed or an external energy source. The integrated energy source 1 as described typically will be that of an integrated rechargeable battery cell or pack further described in FIG. 7. The main utility of this particular energy source 1 will be to transfer some of its energy to the capacitor bank 6. The capacitor bank 6, once fully charged, will have the capability to deliver a burst of higher energy potential than that of the energy source. As previously described, the capacitor bank 6 will then use this energy to restart an already depleted external system. The external energy source will typically be that of any source with at least eight volt direct current and greater than two amp hour internal capacity. This energy will be the minimum required as a system source. Additionally, internal connections between the energy source 1 and the boost circuit 4 are described on FIG. 1, which depicts an internal hardwire connection between boost circuit 4 and energy source 1 using low power transmission lines 2 and 3. Similarly, FIG. 2 shows a temporary connection between boost circuit 4 and energy source 1 using low power transmission lines 2 and 3 with an added feature of clamps 9 and 10. The clamps described in FIG. 2 are not integrated but instead they are provided as accessories to connect this system to an external source via clamping or plug in methods as shown on FIG. 6. The embodiment of the system will have a receptacle that will provide connection means between the invention and an external system further described in FIG. 7. Yet a third method is shown in FIG. 3 with a temporary connection between boost circuit 4 and energy source 1 using low power transmission lines 2 and 3 with a single connector 11, a DC plug (see FIG. 6).

Both transmission lines 2 and 3 directly or indirectly connected to energy source 1 can be fed into boost circuit 4. The transfer of energy to the boost circuit 4 preferably does not occur until the power switch to a microprocessor 12 is active. Microprocessor 12 can be provided with pre-loaded code to control all the timing sequences of the boost circuit 4. The integrated microprocessor control hardware may include additional I/O transmission line 17 for control and communication with the output switch device 15a shown in FIG. 4. The logic scheme can be a direct activation and deactivation between the capacitor bank and an external load device for the purpose of energy transfer.

These three methods provide portability and various connection means for the user to charge the integral capacitor as claimed. FIG. 1 shows a representation of a boost circuit 4. The boost converter, or step up converter as recognized in the industry, can have its sole purpose be to take a low level voltage potential and step it up to a higher voltage potential than that of the source. The preferred voltage signal for the invention is that of a direct current source. There are several methods for achieving a higher voltage potential functionality. This particular method for the invention will include a high frequency pulse width modulator 5 to intensify power and efficiency of our system. The boost circuit will implement a combination of integrated circuit and passive components in order to achieve the desired output of the boost circuit 4. Essentially, the boost circuit 4 will draw power from the energy source 1 through transmission lines 2 and 3, entered as low level potential signal and output as a high level potential signal feeding the current limiter circuit 7. The current limiter circuit will regulate the timing and restrict the maximum current delivery to the capacitor bank 6 as claimed. The current network will essentially regulate current flowing and charging time of the capacitor bank.

Figure 4:
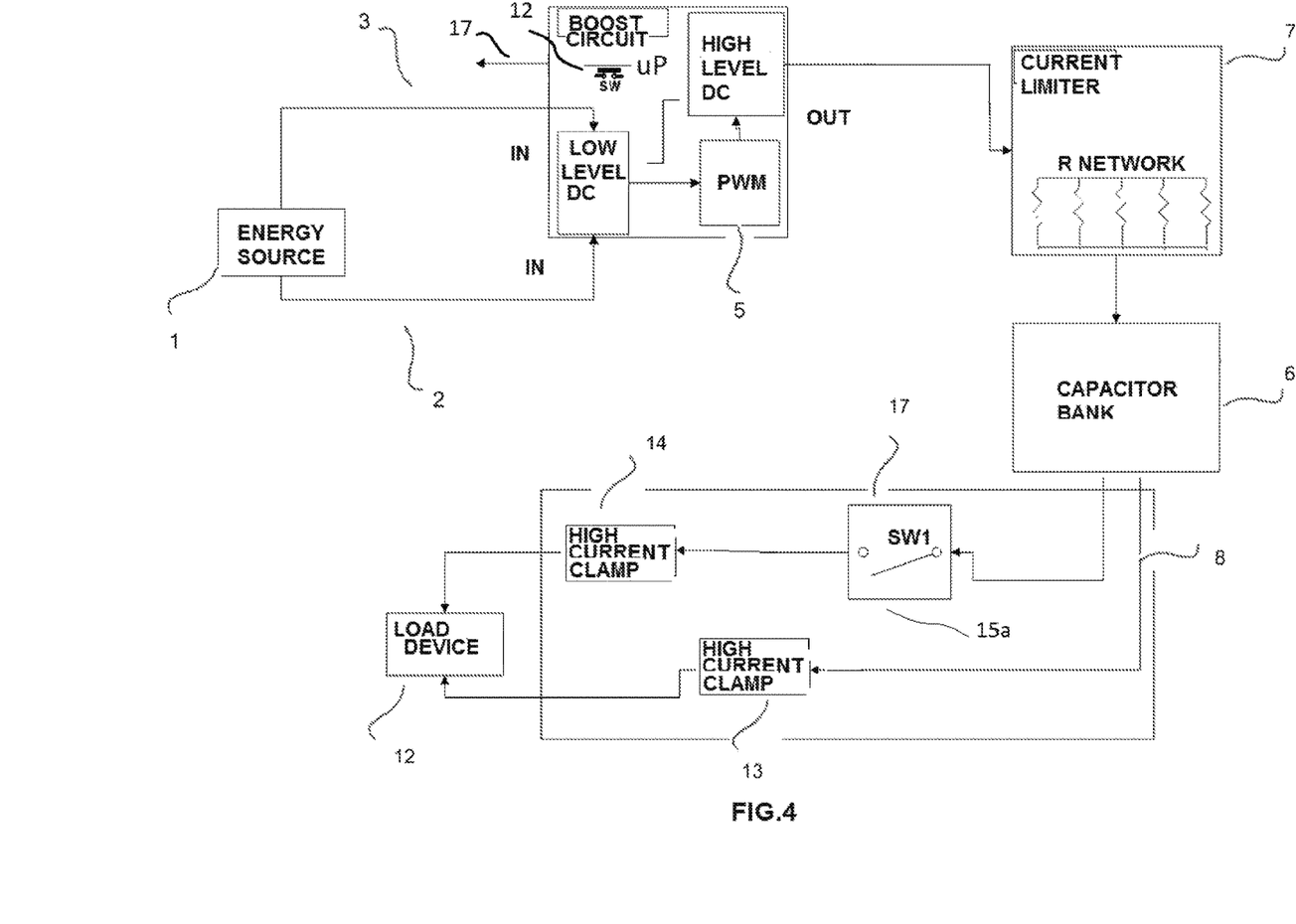

The basic internal operation and functionality of the system has been described and FIG. 4 depicts the final stage of the system. The final stage of the system is to release the stored energy inside the capacitor(s) bank 6 to an external system. The invention will utilize bidirectional high power output/input transmission lines 8. The high power transmission lines 8 can be used as an output and/or an input. The capacitor bank 6 also uses the high power transmission lines 8 to recharge itself to the same level of the external source. Moreover, the energy stored in the capacitor(s) bank 6 preferably can only be delivered to an external load device 12 when the high output power switch 15a is activated. The construction of the output switch or high output power switch 15a can be mechanical, electro-mechanical or electronic solid state device. If the switch is mechanical, a manual activation is permitted. If the switch is either electro-mechanical or electronic, then it can preferably become active when a signal from the onboard microprocessor 12 I/O transmission line 17 is sent to the output switch 15a, which can result in a circuit closure for the primary objective of transferring the energy to the load device 12. Finally, this particular switch will interface with high current clamps 14 and 13. These clamps will connect to the external load device 12 and transfer the energy between both systems. The high current clamps 12 and 13 are permanently attached to the invention. On occasions, there will be detachable high current clamps as shown on FIG. 6. The embodiment of the system will have receptacles that provide connection means between the invention and an external system further described in FIG. 7. It is to be noted that high power switch 17 can be installed on either high power output/input transmission lines 8. The high-power auxiliary transmission line 8, as earlier described, has a two way line used for delivering power to the load and also recharging the high energy storage capacitor as supplementary to low power transmission lines 2 and 3. Unlike when charging through the lower auxiliary power transmission line, the high power auxiliary transmission line 8 can only charge to the same level as the load device 12 and will not be regulated by current limiter circuit 7.

Figure 5:
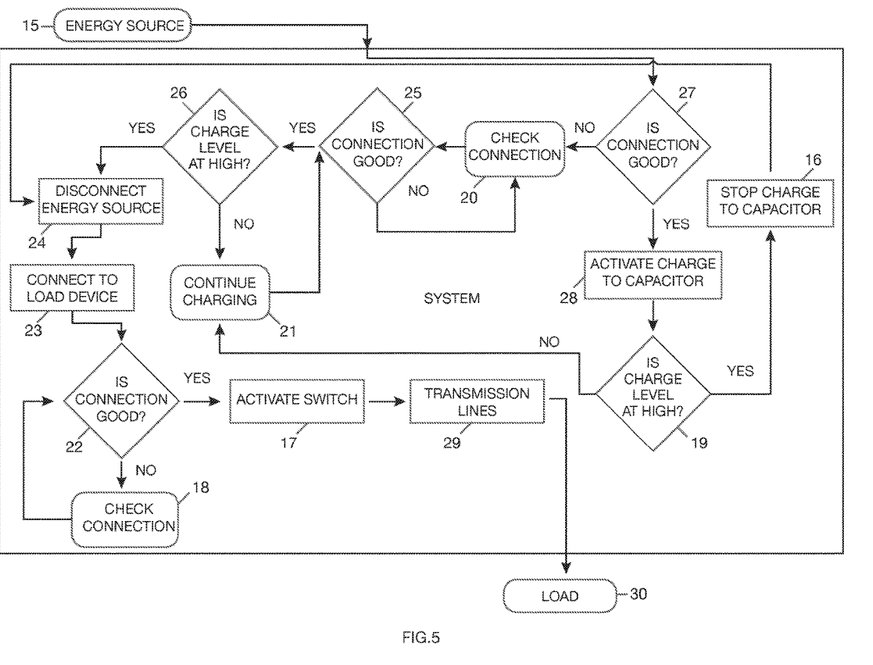
FIG. 5 is a flow diagram explaining the functionality of one non-limiting embodiment for the integral system in accordance with the present disclosure.
Figure 7:
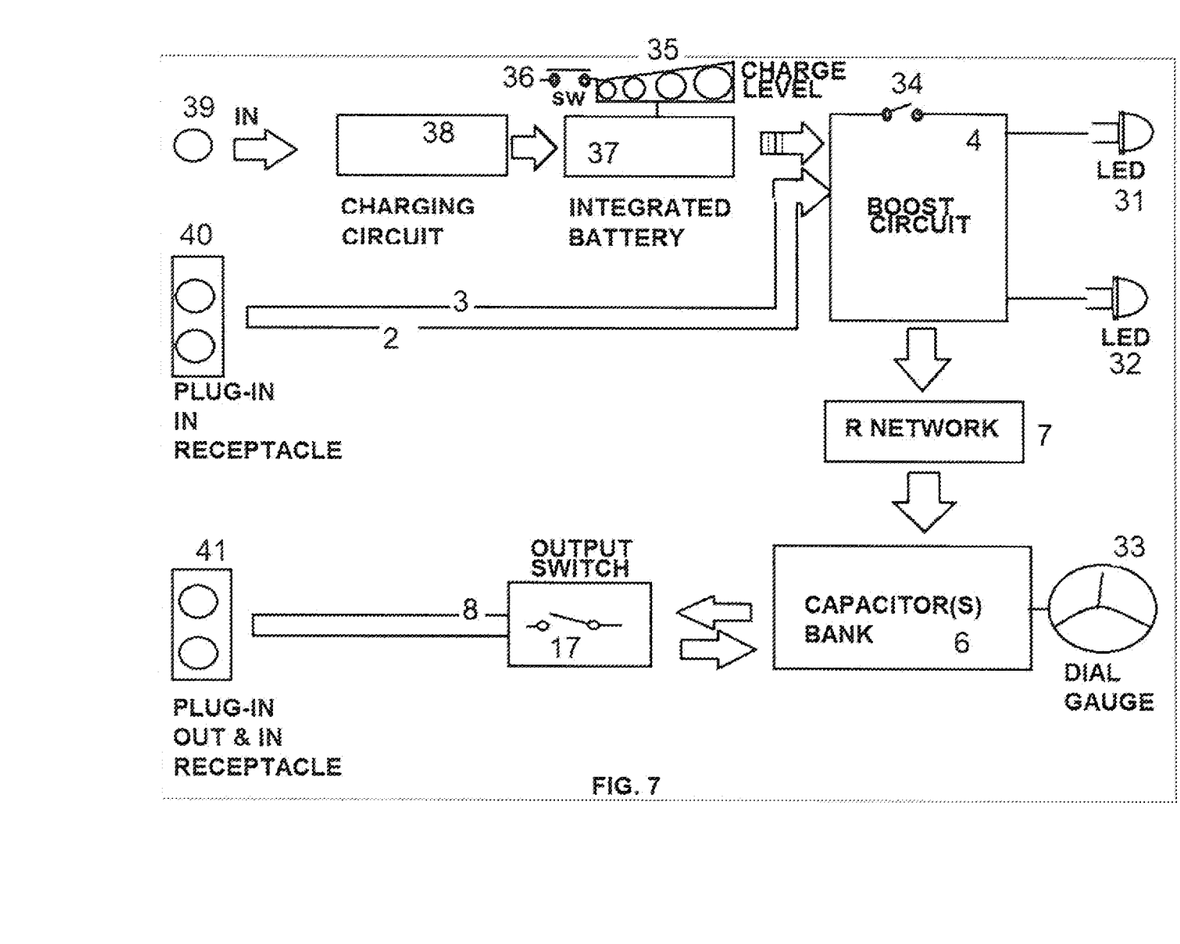
FIG. 7 is a representation of one non-limiting embodiment for the complete system including alternative methods for external connections via input ports and output ports in accordance with the present disclosure and also including an integral battery for fast charging the system.
Figure 8:
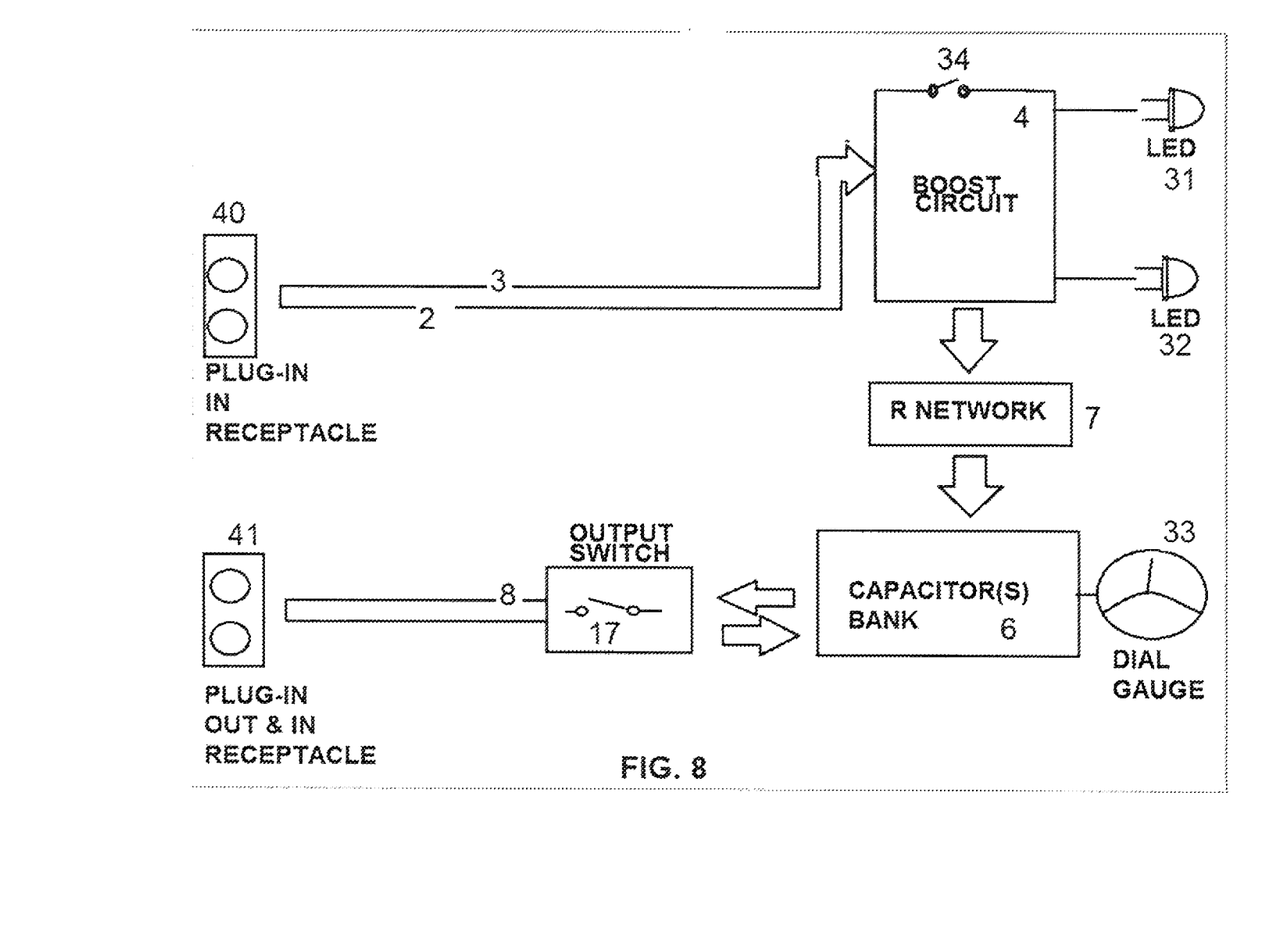
FIG. 8 is a representation of one non-limiting embodiment for the complete system for external connections via input ports and output ports in accordance with the present disclosure.

FIG. 5 is a block diagram showing the flow operation mode of the system. Initially, the energy source 15 will be supplying the necessary energy to charge the capacitor bank as previously described. The energy source 15 will hold enough energy to transfer over to the capacitor(s) bank 6. Furthermore, the energy source could be external or integrated into the system as described on FIG. 7. The system's first process is to verify that a proper connection 27 has been successfully established between the energy source 15 and the system. This connection is detected when the boost circuit 4 detects and begins the charging process of the capacitor(s) bank 6. If no connection is detected, the integral circuit 20 will guide the user to check the connection until a solid connection exist. The good and bad connection indicator will be either by a digital display or simply light emitting diodes ("LEDs") as shown in FIG. 7 or 8. After the connection is verified by circuit 25 (inside the boost circuit 4), the next check point 26 checks the charge level of the system. If the charge level is low, the circuit 26, 21 and 28 continues charging the system until the charge level is high and verified by circuit 19. Once this happens, the charging stops 16. At this point, the user is guided into disconnecting the energy source by circuit 24. The final stage of the process is to deliver the energy stored in the system to an external load device as previously shown on FIG. 4, Block 23, and on FIG. 5, guides the user into the final stage which is to connect the system to a load device. Again, proper connection is checked and verified by circuit 22 and if connection exists, then power switch 17 can be activated and energy will flow through transmission lines 29, onto load 30. The system has several visual indicators to guide the user to perform various tasks from the first step to connect to the energy source into the final step of activating switch 17 for final energy transfer.

Lastly, similar to FIG. 4, FIG. 7 is a representation of the complete system which includes block diagrams representing other secondary components such as connecting ports and visual indicators used to assist the user during operation of this particular invention. As an option, the invention may contain an integrated system source. The integrated battery 37 can be initially charged using a conventional wall cube adapter, which will connect to the in port 39, The charging circuit 38 can regulate and control the voltage and current going to the integrated battery 37 and terminate the charging cycle when complete. The charge level 35 will display the amount of charge available whenever the charge level momentary switch 36 is depressed. Once this step is complete, the system can store until needed or activate the boost circuit 4 by depressing the activate boost switch 34. The working LED 31 will light up indicating the boost circuit 4 is activated and working. Similarly, the visual dial gauge 33 attached to the capacitor(s) bank 6 will start raising from zero percent of charge up to one-hundred percent of charge. At this point the boost circuit 4 will stop charging, and the status LED 32 will change color and indicate ready. A second version of this system, FIG. 8, will eliminate the need for the integral battery and will harvest the energy directly from an external system as described and claimed. The objective is to harvest the extracted energy to sustain or restart an already depleted external systems that otherwise would lose functionality from a shutdown and become ineffective to restart.

At this point, the system is now ready to transfer its energy to an external device via output switch 17 and output/input receptacle 41. The user needs to connect to the output receptacle 41 a pair of high current clamps similar to that already described in FIG. 6 and activate output switch 17.

The above described novel system and method permits transferring, in a matter of minutes, some of the existing reserve energy of a vehicle-installed, discharged car battery or energy of another energy source, and storing it temporarily inside a supercapacitor bank made up of individual supercapacitor cells for the purpose of transferring it back to the same or similar vehicle-installed, discharged battery electrical system instantaneously at a higher energy for the purpose to turn over a vehicle's electrical system with a discharged battery.

The existing reserve energy of a battery or energy from another energy source can be used and temporarily transferred to the supercapacitor bank. Once the supercapacitor bank is fully charged (i.e. minutes), it can be connected in parallel with a vehicle's installed, discharged car battery. The disclosed system can transfer the energy from the supercapacitor bank back into a vehicle's electrical system on demand. This can be achieved because unlike a car battery that has high internal resistance and its energy is stored chemically, supercapacitors store their energy electrically and have a significant lower internal resistance than that of a vehicle battery, making it possible to deliver their internal energy instantaneously at a faster rate and at a higher energy for a short period of time.

Additionally, when the device is coupled in the parallel circuit configuration with the vehicle's installed car battery, the starting current needed to turn over the engine is split across each path (parallel circuit) with respect to their internal impedance, making it possible that the combined total energy become sufficient to turn the engine over via electrical system of a vehicle.

The step-up converter can be provided to charge the supercapacitor bank to its maximum voltage potential using a significant lower voltage source, such as a dissipated, but not dead, car battery that is typically below eleven volts when discharged or energy from another energy source. At which point, eleven volts may not be sufficient for a cranking current to turn over the engine without additional assistance. This is where the supercapacitor provides the boost.

In one non-limiting embodiment, the supercapacitor bank can be a 58 microfarad bank capable of generating up to 250-300 cranking current for 1-2 seconds, which when coupled in parallel with the installed car battery, assists in starting the car. As previously stated, the combined total energy (supercapacitor with remaining battery energy), becomes sufficient to turn the engine over via electrical system of a vehicle.

For larger engines or if larger cranking current is required, the capacitor bank can be doubled without altering the basic functionality of the disclosed system.

As discussed above, the capacitor bank can be charged in accordance with the described boost circuit. The boost circuit, when initially connected to a low energy vehicle battery or other energy source, starts by transferring some of the reserve energy of the vehicle battery or energy from another energy source into the capacitor bank at a current rate allowable by the battery. In one non-limiting embodiment, the boost circuit can be capable of a charging rate of, but not limited to, six amperes. The boost circuit can also monitor the battery or other energy source against complete depletion. This can be noticeable by an on/off duty cycle curve of the boost circuit. The rate of current varies according to the battery reserved capacity. The charging rate can be dependent of the energy source. The transfer of energy from the battery or other energy source to the capacitor can be considered the first stage.

The depleted vehicle battery or other energy source can be electrically coupled with a higher potential unrestricted energy source, causing both sources to begin to balance each other with respect to an ideal twelve-volt electrical system. This enables a vehicle's electrical system the capability to utilize both sources as a single energy potential for the purpose of restarting the electrical system (turning over the engine). Thus, the combined output expands the boost capabilities. Connecting the output side of the capacitor bank to the discharged battery can be considered the second stage.

The final stage can be to crank assist start the electrical system of the vehicle with a depleted battery. It is an industry standard that the minimum current and voltage to turn over a standard vehicle engine should have a minimum threshold of 7.2 volt and a minimum current of 200 amps.

It should be understood that the exemplary embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from their spirit and scope.

All components of the described device/system and their locations, electronic communication methods between the system components, wiring, attachment or securement mechanisms, dimensions, values, shapes, materials, etc. discussed above or shown in the drawings, if any, are merely by way of example and are not considered limiting and other component(s) and their locations, electronic communication methods, wiring, attachment or securement mechanisms, dimensions, values, shapes, materials etc. can be chosen and used and all are considered within the scope of the disclosure.

Unless feature(s), part(s), component(s), characteristic(s) or function(s) described in the specification or shown in the drawings for a claim element, claim step or claim term specifically appear in the claim with the claim element, claim step or claim term, then the inventor does not consider such feature(s), part(s), component(s), characteristic(s) or function(s) to be included for the claim element, claim step or claim term in the claim when and if the claim element, claim step or claim term is interpreted or construed. Similarly, with respect to any "means for" elements in the claims, the inventor considers such language to require only the minimal amount of features, components, steps, or parts from the specification to achieve the function of the "means for" language and not all of the features, components, steps or parts describe in the specification that are related to the function of the "means for" language.

The benefits, advantages, solutions to problems, and any element(s) that may cause any benefit, advantage, or solution to occur or become more pronounced are not to be construed as a critical, required, or essential features or elements of any or all the claims.

While the novel system and method have been described and disclosed in certain terms and has disclosed certain embodiments or modifications, persons skilled in the art who have acquainted themselves with the disclosure, will appreciate that it is not necessarily limited by such terms, nor to the specific embodiments and modification disclosed herein. Thus, a wide variety of alternatives, suggested by the teachings herein, can be practiced without departing from the spirit of the disclosure, and rights to such alternatives are particularly reserved and considered within the scope of the disclosure.

What is claimed is:

1. A system for aiding in starting of a motor vehicle whose vehicle battery has been depleted to an energy level where the vehicle battery is unusable for an intended purpose of starting the vehicle on its own, said system comprising:
    a boost or step up circuit adapted for electrical communication with an external energy source originating outside of the system and capable of extracting energy from the external energy source and boosting a voltage potential for the extracted energy to a higher level than a specific voltage potential level of the external energy source;
    a current limiter circuit in electrical communication with an output of the boost or step up circuit for controlling an amount of energy demand from the external energy source; and
    an integrated single supercapacitor or supercapacitor bank in electrical communication with an output of the current limiter circuit, said single supercapacitor or supercapacitor bank adapted for electrical communication to an external electrical load device and when the single supercapacitor or supercapacitor bank is charged the single supercapacitor or supercapacitor bank is capable and available for delivering all of its stored energy to the external load device such that the delivered stored energy that aids in starting the motor vehicle having the depleted vehicle battery is generated directly from the single supercapacitor or supercapacitor bank;
    wherein the current limiter circuit restricts a maximum current delivered to the single supercapacitor or supercapacitor bank for charging the single supercapacitor or supercapacitor bank with the energy extracted from the external energy source and regulates a charging time for the single supercapacitor or supercapacitor bank with the energy extracted from the external energy source.

2. The system for aiding of claim 1 wherein the boost or step up circuit includes a high frequency pulse width modulator.

3. The system for aiding of claim 1 further comprising a high power switch in electrical communication with an output line of the single supercapacitor or supercapacitor bank, wherein the charged single supercapacitor or supercapacitor bank is permitted to deliver all of its energy to the external load device without reservation to the single supercapacitor or supercapacitor bank when the switch is closed.

4. The system for aiding of claim 1 wherein the external load device is the vehicle battery.

5. The system for aiding of claim 1 wherein the boost or step up circuit is in electrical communication with the external energy source through a pair of transmission lines.

6. The system for aiding of claim 1 wherein the boost or step up circuit is in electrical communication with the external energy source through a pair of transmission lines and a pair of clamps, a first of the pair of clamps connected to a first of the pair of transmission lines and a second of the pair of clamps connected to a second of the pair of transmission lines.

7. The system for aiding of claim 1 wherein the boost or step up circuit is in electrical communication with the external energy source through a pair of transmission lines and a DC plug connected to the pair of transmission lines.

8. The system for aiding of claim 1 wherein the boost or step up circuit further comprising a converter component for converting AC voltage to DC voltage where the external energy source is an AC energy source such that the higher level of voltage potential is a DC voltage potential.

9. The system for aiding of claim 1 wherein the single supercapacitor or supercapacitor bank is a supercapacitor bank.

10. The system for aiding of claim 9 wherein the supercapacitor bank is a 58 microfaarad bank capable of generating about 250 to 300 cranking current in about 1 to 2 seconds.

11. The system for aiding of claim 1 wherein the single supercapacitor or supercapacitor bank is adapted to be coupled in parallel to the external load device.

12. The system of claim 1 wherein the boost or step up circuit is adapted to extract energy form both external AC voltage sources and external DC voltage sources originating outside of the system.

13. A system for aiding in starting of a motor vehicle whose vehicle battery has been depleted to an energy level where the vehicle battery is unusable for an intended purpose of starting the vehicle on its own, said system comprising:
   a boost or step up circuit adapted for electrical communication with an energy source and capable of extracting energy from the energy source and boosting a voltage potential for the extracted energy to a higher level than a specific voltage potential level of the energy source;
   a current limiter circuit in electrical communication with an output of the boost or step up circuit; and
   a single cell or capacitor bank in electrical communication with an output of the current limiter circuit, the single cell or capacitor bank adapted for electrical communication to an electrical load device and when the single cell or capacitor bank is charged the single cell or capacitor bank is capable and available for delivering energy to the load device;
   wherein the current limiter circuit restricts a maximum current delivered to the single cell or capacitor bank from the energy extracted from the energy source and regulates a charging time for the single cell or capacitor bank using the energy extracted from the energy source; and
   wherein the energy source is an integrated battery in electrical communication with the boost or step up circuit and a charging circuit for charging the integrated battery.

14. A method for aiding in starting of a motor vehicle having a vehicle battery that has been depleted to an energy level where the battery is unusable for an intended purpose, said method comprising the steps of:
   (a) extracting at least a portion of energy from an external outside energy source originating external to the motor vehicle;
   (b) boosting or stepping up the specific voltage potential level of the extracted energy to a higher voltage potential level than the specific voltage potential level of the external energy source; and
   (c) charging a single supercapacitor or supercapacitor bank using the extracted energy boosted or stepped up to the higher voltage potential.

15. The method for aiding of claim 14 further comprising the step of virtually instantaneously delivering electrical all of the energy stored in the charged single supercapacitor or supercapacitor bank to an external load device to assist the external load device in being used for an intended purpose of the external load device.

16. The method for aiding of claim 15 further comprising the step of coupling the single supercapacitor or supercapacitor bank in parallel to the external load device prior to delivering the stored energy to the external load device.

17. The method for aiding of claim 14 wherein the intended purpose of the vehicle battery is for turning over an engine of a motor vehicle.

18. The method for aiding of claim 14 further comprising the step of directly or indirectly connecting a boost or step up circuit to the external energy source for performing step (a) and step (b).

19. The method for aiding of claim 14 further comprising the step of regulating the timing of using the extracted energy when charging the single supercapacitor or supercapacitor bank in step (c).

20. The method for aiding of claim 14 further comprising the step of restricting an amount of current that is provided when charging the single supercapacitor or supercapacitor bank in step (c).

21. The method for aiding of claim 14 further comprising the steps of regulating the timing of using the extracted energy and restricting an amount of current that is provided by a current limiter circuit when charging the single supercapacitor or supercapacitor bank in step (c).

22. The method for aiding of claim 14 further comprising the step of closing a high power switch in electrical communication with an output line of the single supercapacitor or supercapacitor bank prior to delivering electrical energy to the external load device from the electrical energy stored by the single supercapacitor or supercapacitor bank.

23. The method for aiding of claim 14 further comprising the step of controlling an amount of energy demand from the external energy source by a current limiter circuit in communication with the boost or step up circuit.

24. The method for aiding of claim 14 further comprising the step of converting extracted AC voltage to DC voltage where the external energy source is an AC energy source such that the higher level of voltage potential is a DC voltage potential.

25. The method for aiding of claim 14 wherein the single supercapacitor or supercapacitor bank is a supercapacitor bank.

26. The method for aiding of claim 25 wherein the supercapacitor bank is a 58 microfaarad bank capable of generating about 250 to 300 cranking current in about 1 to 2 seconds.

27. A method for aiding in starting of a motor vehicle having a vehicle battery that has been depleted to an energy level where the battery is unusable for an intended purpose, said method comprising the steps of:
   (a) extracting at least a portion of energy from an external energy source that is external to the motor vehicle by a boost or step up circuit;
   (b) controlling an amount of energy demanded from the external energy source by a current limiter circuit in communication with the boost or step up circuit;
   (c) boosting or stepping up a specific voltage potential level of the extracted energy to a higher voltage potential level than the specific voltage potential level by the boost or step up circuit, the boost or step up circuit directly or indirectly electrically connected to the external energy source;
(d) regulating the timing of supplying the boosted or stepped up extracted energy and restricting an amount of current that is provided to a single supercapacitor or supercapacitor bank by the current limiter circuit in electrical communication with the single supercapacitor or supercapacitor bank;
(e) charging a single supercapacitor or supercapacitor bank using the extracted energy supplied by the current limiter circuit;
(f) closing a high power switch in electrical communication with an output line of the single supercapacitor or supercapacitor bank in order to provide electrical communication between the single supercapacitor or supercapacitor bank and an external load device; and
(g) virtually instantaneously delivering all of the electrical energy stored in the charged single supercapacitor or supercapacitor bank to the external load device to assist the external load device in being used for an intended purpose of the load device.

28. The method for aiding of claim 27 wherein the external load device is the vehicle battery.

29. The method for aiding of claim 27 wherein the intended purpose of the vehicle battery is for turning over an engine of a motor vehicle.

30. The method for aiding of claim 27 further comprising the step of converting extracted AC voltage to DC voltage where the external energy source is an AC energy source such that the higher level of voltage potential is a DC voltage potential.

31. The method for aiding of claim 27 wherein the single supercapacitor or supercapacitor bank is a supercapacitor bank.

32. The method for aiding of claim 31 wherein the supercapacitor bank is a 58 microfaarad bank capable of generating about 250 to 300 cranking current in about 1 to 2 seconds.

33. The method for aiding of claim 27 further comprising the step of coupling the single supercapacitor or supercapacitor bank in parallel to the external load device prior to delivering the stored energy to the external load device between step (e) and step (f).

34. The method for aiding of claim 27 wherein the boost or step up circuit, the single supercapacitor and the current limiter circuit are provided as an integrated system.

35. A method for aiding in starting of a motor vehicle having a vehicle battery that has been depleted to an energy level where the battery is unusable for an intended purpose, said method comprising the steps of:
(a) extracting at least a portion of energy from an integrated battery;
(b) boosting or stepping up a specific voltage potential level of the extracted energy to a higher voltage potential level than the specific voltage potential level of the integrated battery; and
(c) charging a single supercapacitor or supercapacitor bank using the extracted energy boosted or stepped up to the higher voltage potential.

36. A method for aiding in starting of a motor vehicle having a vehicle battery that has been depleted to an energy level where the battery is unusable for an intended purpose, said method comprising the steps of:
(a) extracting at least a portion of energy from an integrated battery that is external to the motor vehicle by a boost or step up circuit;
(b) controlling an amount of energy demanded from the integrated battery by a current limiter circuit in communication with the boost or step up circuit;
(c) boosting or stepping up a specific voltage potential level of the extracted energy to a higher voltage potential level than the specific voltage potential level by the boost or step up circuit, the boost or step up circuit directly or indirectly electrically connected to the integrated battery;
(d) regulating the timing of supplying the boosted or stepped up extracted energy and restricting an amount of current that is provided to a single cell or capacitor bank by the current limiter circuit in electrical communication with the single cell or capacitor bank;
(e) charging a single cell or capacitor bank using the extracted energy supplied by the current limiter circuit;
(f) closing a high power switch in electrical communication with an output line of the single cell or capacitor bank in order to provide electrical communication between the single cell or capacitor bank and an external load device; and
(g) virtually instantaneously delivering all of the electrical energy stored in the charged single cell or capacitor bank to the external load device.

* * * * *